Patented July 9, 1940

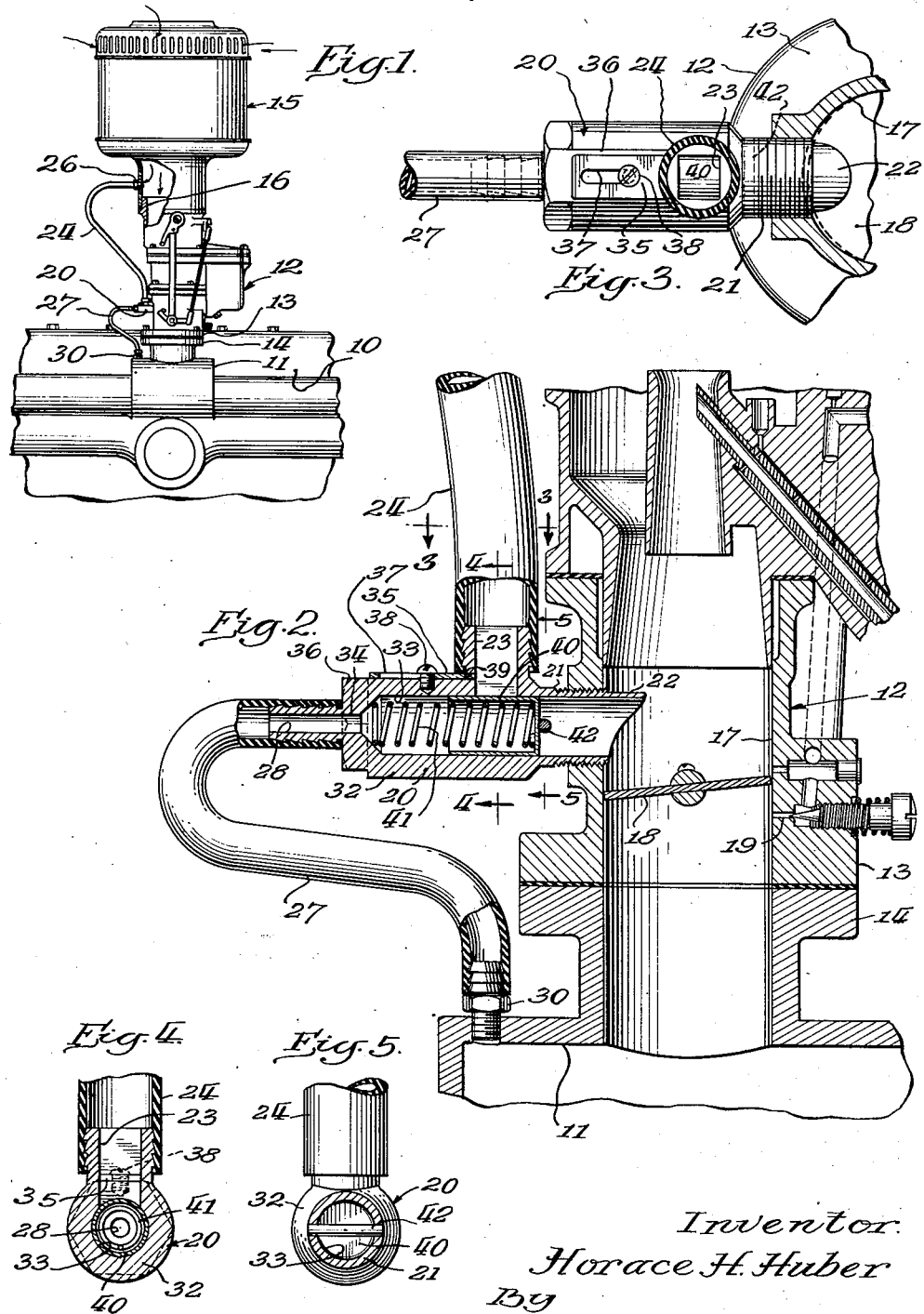

2,207,152

UNITED STATES PATENT OFFICE 2,207,152

AUXILIARY AIR CONTROL FOR CARBURETORS

Horace H. Huber, Chicago, Ill., assignor to Charles A. Pipenhagen, Chicago, Ill.

Application July 2, 1938, Serial No. 217,190

1 Claim. (Cl. 261—63)

My invention contemplates the equipment of an internal combustion engine carburetor with means responsive to engine intake vacuum acting automatically to effect economies in the use of fuel by leaning the combustible mixture created and delivered by the carburetor whenever, with the carburetor throttle opened or partially opened, the engine is not operating under a load sufficient to prevent the development of a substantial vacuum on the posterior or engine side of said throttle.

It is the present day commercial practice of automotive engineers to utilize plain tube carburetors and to adjust such a carburetor to deliver a relatively rich fuel-air mixture which will meet the requirements of the engine when it is operating under heavy load conditions,—and to disregard, or at any rate suffer, that waste of fuel which results from supplying such relatively rich mixture to the engine when the latter is not operating under a condition of load which makes so rich a mixture essential. The devices of the present invention function to lean the mixture when, and only when, the load conditions under which the engine is operating are such that a relatively lean combustible mixture can be supplied without experiencing loss of then requisite power. Therefore, the devices of the present invention are not to be confused with those so-called "economizers" which attempt to realize economies in the use of fuel by introducing additional air into a carburetor delivered combustible mixture at times when leaning of the mixture can be effected only with a concomitant loss in power which at that time is requisite to good performance under then existing load conditions.

In its preferred embodiment my invention comprises a valve unit mounted on or in the wall of a carburetor (desirably a plain tube down draft carburetor) so that it may deliver air through such carburetor wall, for addition to the combustible mixture developed in the carburetor, at a point between the Venturi mixing tube or tubes and the driving throttle which is located intermediate the Venturi mixing tube or tubes and the intake manifold of an automotive vehicle engine. Such valve unit comprises an air valve which is spring biased to closed position and which opens in response to, and, until fully opened, according to the degree of. vacuum developed in the intake manifold of the engine,— such valve unit having a suitable tubular connection with the intake manifold.

When the improvements of the present invention are applied to the carburetor of an automotive vehicle engine, the construction and arrangement of parts is such that the vacuum responsive air valve is open more or less when the vehicle is traveling at any of its ordinary driving speeds (e. g. traveling in a range somewhere between 30 M. P. H. and 50 M. P. H.) and not under heavy load, but is closed whenever the engine is required to deliver greater power than is ordinarily required (e. g. at starting, when moving through mud, climbing a hill, etc.).

In the accompanying drawing,

Fig. 1 is an elevational view illustrating a typical installation of the devices of the present invention;

Fig. 2 is a vertical sectional view of certain of the parts depicted in Fig. 1;

Fig. 3 is a fragmentary top plan view, partly in section, which may be regarded as taken in the plane of the line 3—3 of Fig. 1 and looking in the direction indicated by the arrows;

Fig. 4 is a fragmentary vertical sectional view which may be regarded as taken in the plane of the line 4—4 of Fig. 2 and looking in the direction indicated by the arrows; and Fig. 5 is a fragmentary vertical sectional view which may be regarded as taken in the plane of the line 5—5 of Fig. 2 and looking in the direction indicated by the arrows.

Similar characters of reference refer to similar parts throughout the several views.

In the drawing, reference number 10 denotes an internal combustion engine of the type commonly used on automobiles. The intake manifold is denoted by number 11. A standard carburetor 12, of the downdraft variety, is affixed by its flange 13 to flange 14 of the intake manifold, and bears a standard air filter 15 upon sleeve 16 of its air intake end.

The air valve unit 20 taps into the mixing chamber 17 of the carburetor 12 at a point above the throttle valve 18 and is secured thereto by means of its externally threaded delivery tube 21. The end of this delivery tube 21 is formed with a suitable overhang 22 for the purpose of deflecting the air stream into the downdraft of the carburetor and to permit the downdraft to aspirate air from such delivery tube 21.

The air inlet 23 of the valve unit 20 conveniently is supplied with air through a flexible tube 24, suitably of rubber, sleeved over the air inlet nipple 23. Said flexible tube 24 leads to the throat of the air filter 15 and cooperates with nipple 26 tapped into the air filter throat.

A flexible tube 27, suitably of rubber, sleeved over the vacuum port 28 of the air mixer 20, communicates with the intake manifold 11 through nipple 30 over which it is sleeved.

The body 32 of the valve unit 20 is hollow, having a cylindrical bore 33 contiguous and continuous with the bore of delivery tube 21, and communicating with the vacuum port 28 by means of channel 34. The air inlet 23 joins the cylinder 33 at a point in the body 32 of the valve unit 20 preceding and adjoining the delivery tube 21.

The air inlet 23 may be of any cross section, although a square cross section has been found preferable. The area of this cross section, and hence the volume of air flowing past it, may be varied by means of an adjustable gate valve 35, slidable upon a flat seat 36 of body 32. This valve 35 may be held in any desired position by means of slot 37 and set screw 38. The valve enters the body of air inlet 23 through a relatively tight fitting slot 39.

A hollow piston 40 freely moving in cylinder 33, but making substantially air-tight contact with the walls thereof, is adapted to cover the opening air inlet 23 into cylinder 33. Depending on the extent to which the opening of the air inlet 23 is covered, more or less air is allowed to pass through the body of the valve unit 20 into the carburetor 12.

A coiled spring 41, within the bore 33, urges piston 40 to close the air inlet tube 23. The piston is, however, restrained from moving beyond the point of complete closure by a pin 42 driven through the delivery tube 21 at a point near its junction with the body 32 of the air mixer 20.

Movement of piston 40 against the action of spring 41 is accomplished by subjecting it to suction developed in engine manifold 11. This suction, applied through flexible tube 27 and channel 34, causes the pressure behind piston 40 to be less than the pressure on the front of the piston facing the delivery tube, which is at the pressure of the carburetor mixing chamber 17. Depending upon whether this pressure differential is greater than the pressure exerted by spring 41, piston 40 moves to uncover air inlet 23.

Spring 41 is chosen to be of such strength that the air inlet 23 is completely covered when the manifold suction is very much lower than the mixing chamber suction, and is completely uncovered when the differential suction is of that degree which obtains when the engine is operating under normal conditions, e. g., driving the vehicle over a good road at an ordinary speed, and not under heavy load.

By adjusting the tension of spring 41 to the differential suction at normal driving conditions, the air mixer may be caused to admit air to the carburetor mixing chamber 17 during said normal operating conditions, to the end of yielding real fuel economy by causing the leanest satisfactory fuel mixture to be supplied to the engine under ordinary driving conditions at ordinary driving speeds.

The adjustable gate-valve 35 may be set at a position limiting the amount of air passing into the air mixer. This setting may be used to adapt the valve unit and carburetor to the requirements of the particular engine on which they are installed.

Having thus illustrated and described one preferred embodiment of my invention I wish to avail myself of all equivalent constructions which are within the ambit of my invention as defined by the appended claim.

What I claim as new and desire to secure by Letters Patent of the United States is:

In combination with the intake of an internal combustion engine and a carburetor therefor of the type wherein the throttle is posterior to the main fuel feed into the mixing chamber, a fuel saver device for delivering auxiliary air to the air-fuel mixture to the intake when the engine is neither idling or under heavy load, the fuel saver device comprising delivery passage means through the carburetor wall into its mixing chamber intermediate the throttle and main fuel feed, a supply passage for supplying to the delivery passage air at pressure above the mixing chamber pressure, a variable-port slide valve interposed between the supply passage and the delivery passage for closing off and for variably opening the auxiliary air flow, spring means urging the valve closed, a suction passage subjecting to intake suction the side of the valve opposite that exposed to the delivery passage pressure, for tending to open the valve substantially in response to, and in proportion to, the suction differential between the intake and the mixing chamber, the delivery passage means comprising a tube having the upper portion of its discharge end shaped as an overhanging lip extending into the mixing chamber upstream of the delivery passage for creating turbulence in the carburetor to promote inmixing of the auxiliary air, for increasing by aspiration the suction on the delivery passage face of the valve slightly to withhold opening of the valve whereby to promote a limited snap-action of the valve in only its initial opening of the valve port, and for promoting by aspiration a flow of auxiliary air through the port when the valve is open.

HORACE H. HUBER.